United States Patent [19]

Lippert

[11] Patent Number: 5,624,611
[45] Date of Patent: Apr. 29, 1997

[54] REPLICATION OF OPTICALLY FLAT SURFACES

[75] Inventor: Thomas M. Lippert, Princeton, N.J.

[73] Assignee: Honeywell Inc., Minneapolis, Minn.

[21] Appl. No.: 444,272

[22] Filed: Jul. 26, 1995

Related U.S. Application Data

[63] Continuation of Ser. No. 996,251, Dec. 23, 1992, abandoned.

[51] Int. Cl.⁶ .................................................. B29D 11/00
[52] U.S. Cl. ............................. 264/1.36; 134/3; 264/1.7; 264/1.9; 264/496
[58] Field of Search ......................... 264/1.36, 494, 264/1.7, 1.9, 233, 496; 134/3

[56] References Cited

U.S. PATENT DOCUMENTS

| | | | |
|---|---|---|---|
| 2,408,540 | 10/1946 | Williams | 264/1.7 |
| 3,410,636 | 11/1968 | Herrick | 427/162 |
| 3,458,348 | 7/1969 | Sherman | 351/166 |
| 3,968,309 | 7/1976 | Matsuo et al. | 264/1.7 |
| 4,147,565 | 4/1979 | Puyplat | 148/6.15 |
| 4,242,412 | 12/1980 | Funaki et al. | 428/412 |
| 4,319,945 | 3/1982 | Howden | 264/1.7 |
| 4,374,077 | 2/1983 | Kerfild | 264/175 |
| 4,417,790 | 11/1983 | Dawson et al. | 351/166 |
| 4,449,478 | 5/1984 | Kraus | 118/720 |
| 4,556,605 | 12/1985 | Mogami et al. | 428/331 |
| 4,615,847 | 10/1986 | Howden | 264/1.7 |
| 4,637,904 | 1/1987 | Rounds | 264/1.9 |
| 4,826,553 | 5/1989 | Armitage et al. | 156/223 |
| 4,852,436 | 8/1989 | Benjamin | 82/19 |
| 5,104,212 | 4/1992 | Taboury et al. | 264/1.7 |
| 5,131,969 | 7/1992 | Gamble et al. | 156/196 |
| 5,183,597 | 2/1993 | Lu | 264/1.7 |

FOREIGN PATENT DOCUMENTS

| | | |
|---|---|---|
| 0465356 | 1/1992 | European Pat. Off. |
| 582248 | 11/1946 | United Kingdom . |
| 871863 | 7/1961 | United Kingdom . |
| WO81/02236 | 8/1981 | WIPO . |

OTHER PUBLICATIONS

Alan DeCew, Precision Optical Fabrication Through Hybrid Processing, Jun. 1987, *Lasers & Optronics*, pp. 105–106.

J. David Briers, Andy Devlin, Aspheric Optics by Diamond Machining, *Photonics Spectra 89*, Dec. 1986, pp. 89–91.

*Primary Examiner*—Mathieu D. Vargot
*Attorney, Agent, or Firm*—Thomas A. Rendos

[57] ABSTRACT

A method of replicating an optically flat surface includes providing a plastic optical element having a machined flat surface. The machined flat surface includes a plurality of ridges thereon. A coating material is applied to an optically perfect flat and the optical element is rolled and positioned on the coating material applied to the optically perfect flat such that grooves between the ridges with the coating material. The coating material sandwiched between the optical element and the optically perfect flat is cured and the optically perfect flat is removed from the cured coating material.

9 Claims, 2 Drawing Sheets

REPLICATION OF OPTICALLY FLAT SURFACES

This application is a continuation, of application Ser. No. 07/996,251, filed Dec. 23, 1991, now abandoned.

FIELD OF THE INVENTION

The present invention pertains to the coating of surface machined optical elements. In particular, the invention pertains to a replication method for replicating optically flat surfaces on a surface machined optical element.

BACKGROUND OF THE INVENTION in many optical designs, solid-glass optical components are used for reflection at their faces to provide redirection of optical imaging therethrough. However, the use of solid-glass optical components may introduce a large amount of weight into a design, rendering the design unusable. For example, various optical systems are used in conjunction with headgear of aviation navigators. Such components may include combiner elements utilized in display systems of aviation headgear. The combiner elements may be prismatic with two parallel flat surfaces for internal reflection of light therethrough. An optical system constructed of glass components may result in headgear that is too heavy to serve its intended purpose.

As is known to one skilled in the art, the use of plastic to produce light weight optical elements can solve the problem associated with the weight of glass components. The surfaces of such plastic optical elements can be machined to many various geometric surfaces, including optically flat surfaces. One method of such machining is diamond turning as described in U.S. Pat. No. 4,852,436 to Benjamin or as is generally known to one skilled in the art.

Although it is possible to diamond turn surfaces of plastic optical elements, it is expensive and difficult because of the softness of the plastic material and because of other physical characteristics of the material. Machining, such as diamond turning, does not produce a completely smooth surface. The diamond turning, for example, produces an optically flat surface on a plastic optical element which has many ridges thereon. Although these ridges are minimal, about 50 Angstroms from peak to trough, in high performance optical systems utilizing short wavelengths, such ridges can create a haze from diffraction or light scattering due to the microscopic defects or ridges as light passes through the optical element. Such haze is unacceptable when the optical element is used in vision-type systems. In order to reduce the diffraction and haze, it is necessary that the diamond turned surfaces be smoothed or be formed as near to a perfectly optically flat surface as possible so that such diffraction or light scattering due to the ridges is eliminated.

in addition, diamond turning may not produce a surface with ridges thereon, wherein the ridges are of the same height. The surface may also not fall in a perfectly flat plane as the edges of the surface may either be above or below a plane established by the center of the flat surface because of movement of the machining tool or because of the softness of the plastic material. Such differences of various locations of the flat surface produce internal reflection problems when dealing with short wavelengths. Such reflection defects become additive when you consider that both parallel flat surfaces may have such dimensional defects.

In co-pending application, U.S. Ser. No. 07/996, 283 entitled "Spin Deposition of a Nonconformal Coating Surface to Machined Optical Asphere Surfaces," a method is shown for spin depositing a coating material on a plastic optical element so as to produce a nonconformal surface on a machined surface of an optical element to eliminate haze effects. However, such a spin deposition method if used to create an optically flat surface, would create a thickness gradient of the material coating on a machined flat surface which would be greater toward the edges of the machined surface as opposed to the geometric center. Such a thickness gradient would produce optical system problems. There exists a need for a method to replicate optically flat surfaces in order to eliminate the diffractional haze without producing other unwanted effects such as varied thickness over the optically flat surface in order to provide for near perfect internal reflection through an optical element, such as a combiner.

SUMMARY OF THE INVENTION

The present invention is directed to a method for replicating an optically flat surface on a machined surface of an optical element. In one embodiment of the invention, the method includes providing a plastic optical element having a machined flat surface; the machined flat surface includes a plurality of ridges. A coating material is applied to a substantially optically perfect flat and the optical element is rolled onto and positioned on the coating material applied to the optically perfect flat such that grooves between the ridges are filled with the coating material. The coating material sandwiched between the optical element and the optically perfect flat is cured and the optically perfect flat is removed from the cured coating material.

In a further embodiment of the invention, the method also includes an additional flat surface parallel to and facing opposite the machined flat surface of the optical element. The additional flat surface has an additional plurality of ridges. An additional coating material is applied to the additional flat surface of the optical element. An additional substantially optically perfect flat is rolled onto and positioned on the additional flat surface such that grooves between the additional plurality of ridges on the additional flat surface are filled with the additional coating material. The additional coating material between the additional flat surface and the additional optically perfect flat is cured while the coating material between the machined flat surface and the optically perfect flat is cured resulting in a cured assembly. The additional optically perfect flat is then removed from the cured additional coating material.

In yet a further embodiment of the invention, the replication method includes providing a plastic optical member having a machined flat surface. The machined flat surface has a plurality of ridges. A coating material is applied to the flat surface and a substantially optically perfect flat is rolled across the machined flat surface and positioned on the machined flat surface such that grooves between the ridges are filled with the coating material. The coating material sandwiched between the machined flat surface and the optically perfect flat is then cured; resulting in a cured assembly. The optically perfect flat is then removed from the cured coating material.

DESCRIPTION OF THE PREFERRED EMBODIMENT

Figure 1:
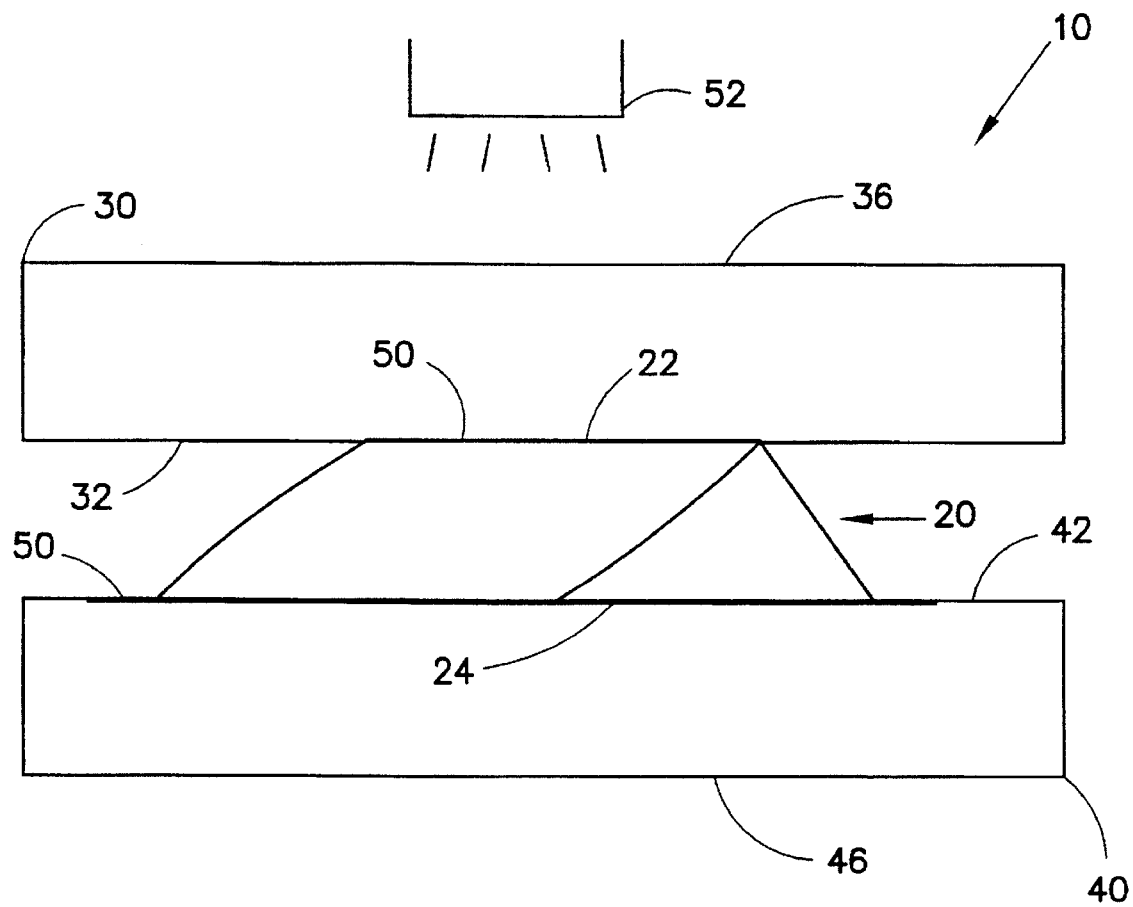
FIG. 1 is a side view of a cured assembly in accordance with the present invention.
Figure 2:
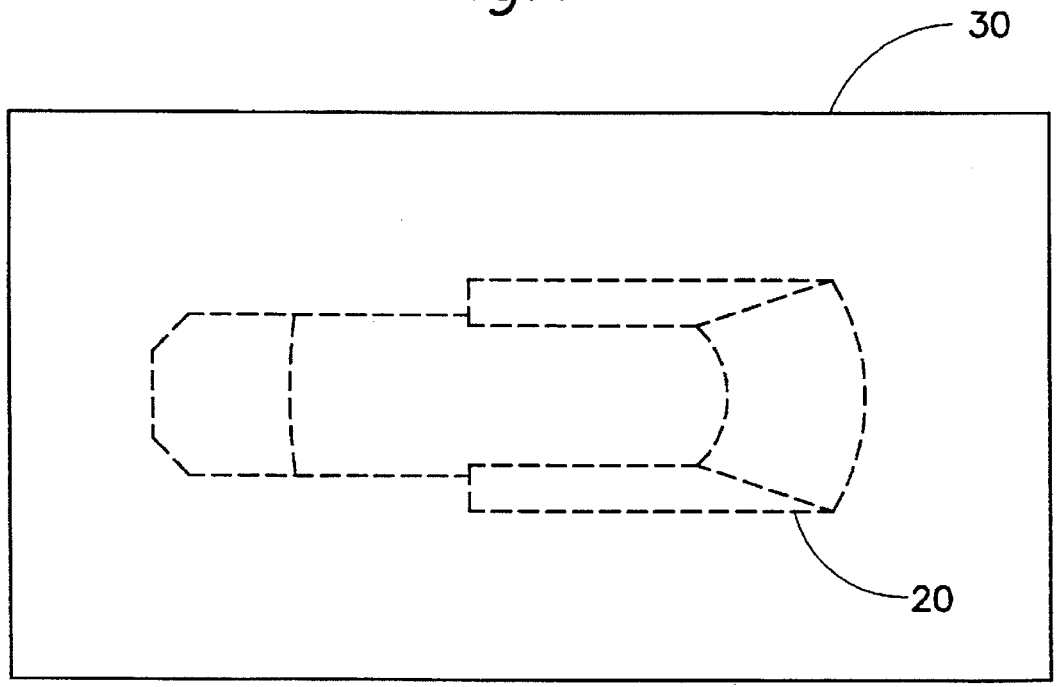
FIG. 2 is a top plan view of the cured assembly as shown in FIG. 1.
Figure 3:
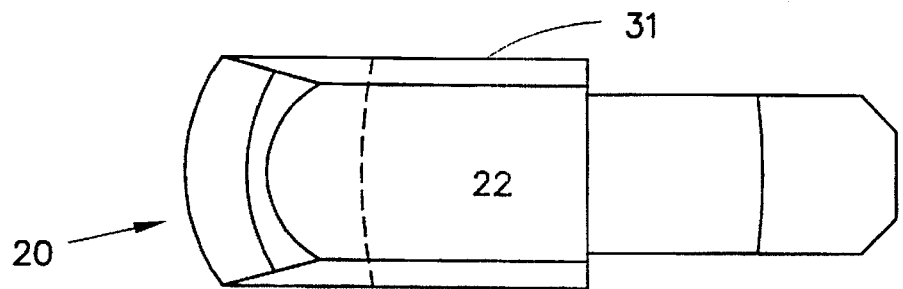
FIGS. 3–5 are a top plan view, a side view, and a bottom plan view, respectively, of an optical element upon which optically flat surfaces are to be replicated by the method of the present invention.
Figure 4:
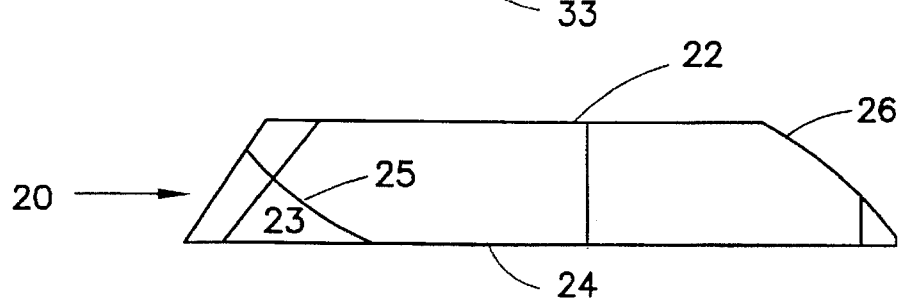
Figure 5:
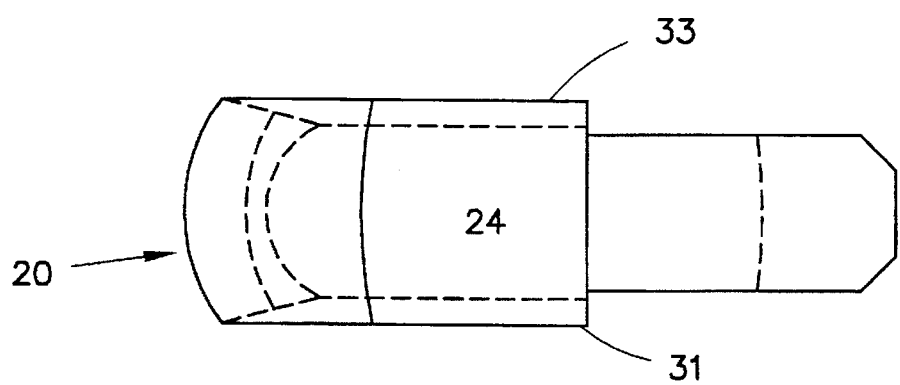
Figure 6:
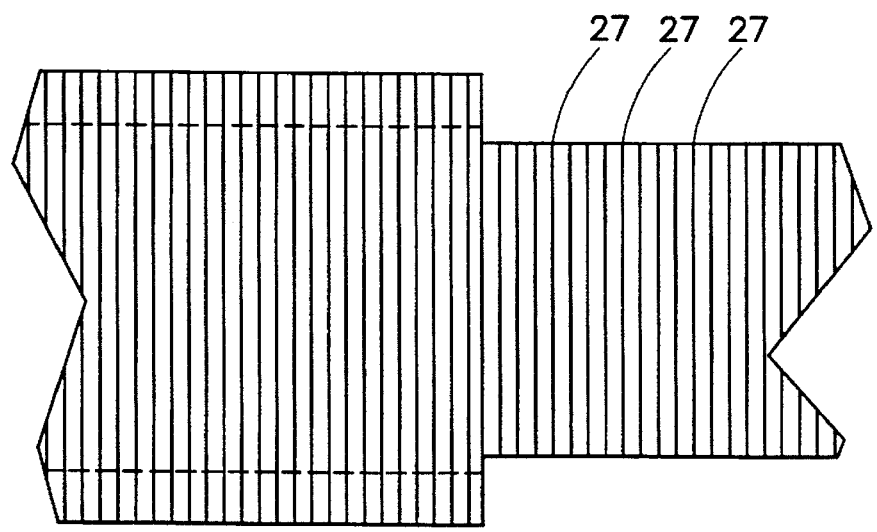
FIG. 6 is an enlarged portion of the optical element in FIGS. 3–5.

In accordance with the principles of the present invention, a method for replicating an optically flat surface on a plastic optical element 20, such as a combiner element, shall be described with reference to FIGS. 1–6. The optically flat surfaces to be replicated are those of two quartz optical flats 30, 40. These optically flat surfaces are replicated on a plastic optical element 20, such as an acrylic element. Plastic optical element 20, FIGS. 3–5, includes a top machined flat surface 22 and a bottom flat machined surface 24. The two surfaces are substantially parallel to each other and face in opposite directions. The optical element is rectangular-like in shape and includes two optical aspheres 25, 26 which connect the top and bottom machined flat surfaces 22, 24 at their respective ends. Optical element 20 may also include an end cap 23 which is bonded to optical asphere 25 in a manner known to one skilled in the art. The machined flat surfaces 22, 24 of the plastic optical element 20 are fly cut by diamond machining. This diamond machining leaves a plurality of ridges 27 with grooves therebetween on the top and bottom machined flat surfaces 22, 24 as shown in detail in FIG. 6. The ridges shown in FIG. 6 are exaggerated. Typically, ridges are about 50 Angstroms peak to trough. Such ridges cause haze due to diffraction as light is reflected through the optical element 20. These top and bottom flat surfaces must be smoothed through the replication method of the present invention to prevent such diffraction and further create two flat optical surfaces for internal reflection of light of short wavelength therethrough.

To begin the replication process, the optical element 20 is cleaned to remove any impurities thereon such that a coating material later deposited on the optical element 20 will bond successfully to the machined flat surfaces. In the preferred embodiment, the optical element 20 is wiped to remove all oils from the surfaces. The element 20 is then laid in a solution of 1%–3% microdetergent per deionized water for 30–60 minutes. The surfaces are scrubbed with a soft material such as a cotton ball soaked in a similar or same solution. The optical element 20 is rinsed thoroughly with running deionized water and then is blown dry with filtered nitrogen, $N_2$. The optical element 20 is then baked for about 2 hours at about 50° C. and allowed to cool to room temperature in a laminar flow structure.

In a similar manner, high quality substantially optically perfect flat surfaces which are to be replicated are also thoroughly cleaned. The optically perfect flat surfaces include surface 32 of quartz optical flat 30 and optical flat surface 42 of quartz optical flat 40. Quartz optical flats are the preferred optical flat surface of the present invention. However, any substantially optically perfect flat surface, such as high quality float glass, may be utilized and is contemplated by the present invention.

The quartz optical flat surfaces 32, 42 are prepared and thoroughly cleaned by cleansing with a chromic acid solution, such solution including one 9-lb. bottle of sulfuric acid and 41 grams of sodium dichromate. Other solutions having similar characteristics may also be utilized. The quartz optical flats are then rinsed under running deionized water to remove any residual cleaning solution and any other impurities. The quartz optical flats are then dried in a 100° F. oven or with isopropyl alcohol. The quartz optical flats are thoroughly cleaned in order to prevent the optical flats from bonding to the coating material utilized in replicating the optically flat surface on the optical element 20. In the preferred embodiment, the quartz optical flats 30, 40 are approximately 2 inches thick. The optically flat surfaces 32, 42 on the quartz optical flats 30, 40 are microscopically examined for flaws which may lead to replication of an imperfect optically flat surface.

After the optical element 20 and the quartz optical flats 30, 40 are cleaned, one quartz optical flat 40 is positioned such that optically flat surface 42 faces upward. A coating material 50 is then applied to optically flat surface 42 of quartz optical flat 40. With a fluid dropper, the dropper cleaned with the use of acetone, deionized water, and blown dry or oven baked, a predetermined quantity of coating material is retrieved and applied onto the optically flat surface 42. An area of the optically flat surface 42 slightly larger than the area of the bottom machined flat surface 24 is flooded with the coating material 50. The coating material 50 is allowed to run out of the dropper before application to the optically flat surface 42 so as to prevent creation of air pockets within the coating material 50 when the material is applied to the surface 42.

Although other UV curable coatings may be utilized for different applications, the preferred coating material is GAF-GARD 233 Radiation Curable Coating, known as Pentaerythritol Triacrylate/Vinylpyrrolidone available from GAF Chemicals Corporation, 1361 Alps Road, Wayne, N.J. 07470, a subsidiary of GAF Corporation. The coating material 50 is filtered once through a 0.45 micrometer filter and twice through a 0.2 micrometer filter. It is applied to the optically flat surface 42 without, dilution. The coating material must have an index of refraction when cured that matches that of acrylic. After the coating material 50 has been allowed to settle, machined flat surface 24 is rolled onto and positioned on optically flat surface 42. The optical element 20 is rolled across the optically flat surface 42 beginning with side 33 of optical element 20 and proceeding to side 31 thereof. By rolling the optical element across the coating material 50 applied to optically flat surface 42, grooves between the ridges 27 of the machined flat surface 24 fill and excess coating material is displaced from between the optically flat surface 42 and machined flat surface 24. A thin layer of coating material 50 is thus formed.

Following the rolling of the optical element 20 on quartz optical flat 40, the machined flat surface 22 is now facing upward and has ridges 27 thereon from the diamond machining of surface 22 on the plastic optical element 20. Machined flat surface 22 is then flooded with coating material 50 in much the same way as the optically flat surface 42 was flooded previously. Such flooding must fill the grooves between the ridges 27 of the machined flat surface 22.

With the grooves between the ridges 27 flooded with coating material 50, the second quartz optical flat 30 having the optical flat surface 32 is then rolled onto and positioned on machined flat surface 22 and the coating material 50 applied thereto. The optically flat surface 32 is rolled across from side 32 of the optical element 20 to side 31 of the optical element 30. Once again the rolling assures the filling of the grooves between ridges 27 on the machined flat surface 22, preventing air pockets from forming therein and displacing excess coating material 50.

Now that the optical element 20 is sandwiched between the two quartz optical flats 30, 40, there is still a possibility of excess hard coating material between the machined flat surfaces 24, 22 and the quartz optically flat surfaces 42, 32. In order to assure that all the grooves between the plurality of ridges 27 are filled with hard coating material and any excess hard coating material is displaced from between the machined flat surfaces 24, 22 and the quartz optically flat surfaces 42, 32, a force is applied on the top surface 36 of quartz optical flat 30 for approximately 10 seconds. In the preferred embodiment, the force is provided merely by a person pressing firmly down on the surface 36. It may be beneficial to apply this force two or three times for approximately 5 seconds. This creates a layer of coating material between the machined surfaces and the quartz optically flat surfaces of less than 10 microns.

Now that the optically flat surfaces 32, 42 are properly seated against the top and bottom machined flat surfaces 22, 32 of optical element 20 via the coating material 50, the coating material is cured by positioning the sandwiched assembly, including optical element 20 and quartz optical flats 30, 40, under a UV light 52. The sandwiched assembly is cured for approximately 5 seconds under a UV light of about 600 watts/inch. It should be known that other wattages of curing lamps will perform the curing function in different time frames and that the present invention is not limited to that described above.

During the curing process, the coating material 50 is hardened and bonds with the top and bottom machined flat surfaces 22, 24. To a lesser extent, a bond is formed to the optically flat surfaces 32, 42 of quartz optical flats 30, 40. Therefore, the quartz optical flats 30, 40 must be removed from the coating material 50. To remove the quartz optical flats 30, 40 from the cured sandwiched assembly, the cured assembly 10 is heated in a 50° C. oven for approximately one hour. The assembly 10 is then removed and allowed to cool to room temperature. During the cooling of the cured assembly 10 to room temperature, the quartz optical flats 30, 40 will become separable from the layer of cured coating material 50. If the quartz optical flats 30, 40 are not separated from the coating material 50, then the process of exposing the cured assembly 10 to heat and then allowing it cool to room temperature is repeated. After the quartz optical flats 30, 40 are removed, the machined flat surfaces 22, 24 are replications of the quartz optical flat surfaces 32, 42. The two optically flat surfaces simultaneously created by this process are substantially parallel to each other as required to provide internal reflection therethrough without distortion.

Those skilled in the art will recognize that only preferred embodiments of the present invention have been disclosed herein, other advantages may be found and realized, and various modifications may be suggested by those versed in the art, and it should be understood that the embodiment shown herein may be altered and modified without departing from the true spirit and scope of the invention as defined in the accompanying claims.

What is claimed is:

1. A method of replicating optically flat surfaces, comprising the steps of:
   providing a plastic optical element having a machined flat surface and an additional machined flat surface parallel to and facing opposite said machined flat surface, each of said machined flat surface and said additional machined flat surface including a plurality of ridges thereon;
   applying a coating material to a substantially optically perfect flat;
   rolling said plastic optical element onto and positioning said plastic optical element on said coating material such that grooves between said plurality of ridges on said machined flat surface fill with said coating material;
   applying additional coating material to said additional machined flat surface of said plastic optical element;
   rolling an additional substantially optically perfect flat onto and positioning said additional substantially optically perfect flat on said additional machined flat surface such that grooves between said plurality of ridges on said additional machined flat surface fill with said additional coating material;
   curing said coating material sandwiched between said plastic optical element and said substantially optically perfect flat and said additional coating material sandwiched between said plastic optical element and said additional substantially optically perfect flat resulting in a cured assembly; and
   removing said optically perfect flat and said additional optically perfect flat from said cured coating material and cured additional coating material, respectively.

2. A method according to claim 1, wherein said step of rolling an additional optically perfect flat onto said additional flat surface includes the step of pressing said additional optically perfect flat for a predetermined time and with a force so that excess coating material between said machined flat surface and said optically perfect flat and excess coating material between said additional machined flat surface and said additional optically perfect flat is displaced from therebetween.

3. A method according to claim 1, wherein said applying steps include the step of flooding said optically perfect flat and said additional flat surface with coating material such that said coating material is fluid on said surfaces with no air pockets therein.

4. A method according to claim 1, wherein said optically perfect flat and said additional optically perfect flat are quartz optical flats and wherein said applying steps includes the step of preparing said quartz optical flats, said preparing step including the steps of:
   cleaning said quartz optical flats with an acidic solution;
   rinsing said quartz optical flats to remove any impurities; and
   drying said quartz optical flats.

5. A method according to claims 4, wherein said drying step includes the step of heating said quartz optical flats in an oven.

6. A method according to claim 4, wherein said drying step includes drying said quartz optical flats with an alcohol solution.

7. A method according to claim 1, wherein said curing step includes the step of exposing said coating material sandwiched between said machined flat surface and said optically perfect flat and between said additional machined flat surface and said additional optically perfect flat to UV light.

8. A method according to claim 1, wherein said removing step includes the steps of:
   heating said cured assembly to a predetermined temperature above room temperature;
   cooling said cured assembly to room temperature; and
   separating said optically perfect flat from said coating material and said additional optically perfect flat from said additional coating material.

9. A method according to claim 4, wherein said removing step includes the steps of:
   heating said cured assembly to a predetermined temperature above room temperature;
   cooling said cured assembly to room temperature; and
   separating said quartz optical flats from said coating material and said additional coating material.

* * * * *

UNITED STATES PATENT AND TRADEMARK OFFICE
CERTIFICATE OF CORRECTION

PATENT NO. : 5,624,611
DATED : April 29, 1997
INVENTOR(S) : Thomas M. Lippert

It is certified that error appears in the above-indentified patent and that said Letters Patent is hereby corrected as shown below:

On the title of the patent in the abstract, line 7, please insert "fill" after --ridges--

Signed and Sealed this

Twenty-second Day of July, 1997

Attest:

BRUCE LEHMAN

*Attesting Officer*　　　*Commissioner of Patents and Trademarks*